US009052012B2

(12) United States Patent
Bialas et al.

(10) Patent No.: US 9,052,012 B2
(45) Date of Patent: Jun. 9, 2015

(54) SHIFT-BY-WIRE SYSTEM FOR A VEHICLE, AND A TRANSMISSION RANGE SELECTION METHOD THEREOF

(71) Applicant: GM GLOBAL TECHNOLOGY OPERATIONS LLC, Detroit, MI (US)

(72) Inventors: Daniel A. Bialas, Ann Arbor, MI (US); Orson S. Wang, Novi, MI (US); Anne Bliss, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 14/032,495

(22) Filed: Sep. 20, 2013

(65) Prior Publication Data

US 2015/0082931 A1    Mar. 26, 2015

(51) Int. Cl.
  *G06F 7/00*  (2006.01)
  *F16H 61/02* (2006.01)
  *F16H 59/10* (2006.01)
  *F16H 59/12* (2006.01)

(52) U.S. Cl.
  CPC ......... *F16H 61/0213* (2013.01); *Y10T 74/2003* (2015.01); *F16H 59/105* (2013.01); *F16H 59/12* (2013.01)

(58) Field of Classification Search
  CPC ....... F16H 59/02; F16H 59/10; F16H 59/105; F16H 59/12; F16H 61/0213; Y10T 74/2003
  See application file for complete search history.

(56) References Cited

U.S. PATENT DOCUMENTS

| 7,566,289 B2 * | 7/2009 | Inoue et al. ..................... 477/34 |
| 8,004,275 B2 * | 8/2011 | Wang et al. .............. 324/207.24 |
| 8,301,348 B2 * | 10/2012 | Nagashima et al. ............ 701/58 |
| 8,423,232 B2 * | 4/2013 | Tsutsumi et al. ............ 701/29.7 |
| 8,671,745 B2 * | 3/2014 | Deurloo et al. ............ 73/115.03 |
| 8,770,369 B2 * | 7/2014 | Ueno et al. .................. 192/219.4 |
| 2009/0287383 A1 * | 11/2009 | Fujii et al. ....................... 701/51 |
| 2010/0206118 A1 * | 8/2010 | Nagashima et al. ........ 74/473.18 |

* cited by examiner

*Primary Examiner* — David D Le
(74) *Attorney, Agent, or Firm* — Quinn Law Group, PLLC

(57) ABSTRACT

A method for determining a transmission range selection of a shift-by-wire system, which includes a shift lever, a park button, and a controller, is provided. The shift lever is movable between a plurality of transmission range positions, each corresponding to a transmission range, and a null position. The park button is switchable between a pressed position corresponding to a Park transmission range, and a released position. The method includes determining, by the controller, if at least one predetermined condition exists. If it does, then the controller determines the transmission range selection to be the Park transmission range. Otherwise, the controller determines the transmission range selection to be the transmission range corresponding to the transmission range position in which the shift lever is positioned.

11 Claims, 1 Drawing Sheet

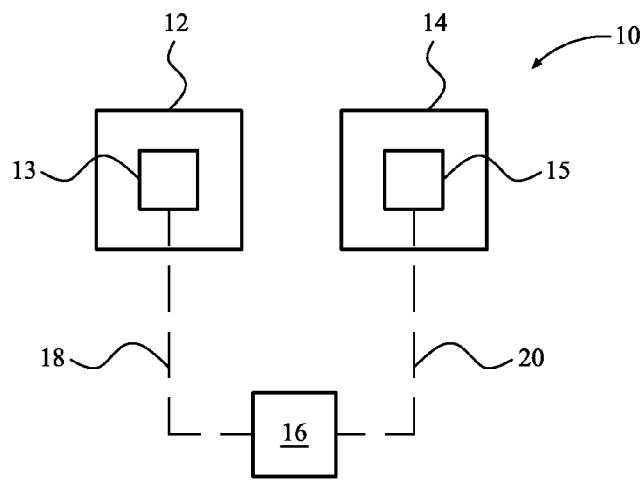
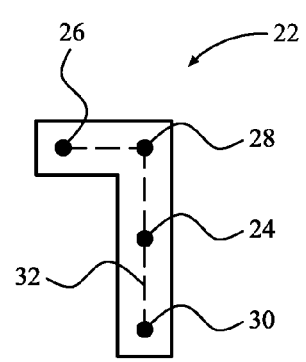
FIG. 1
FIG. 2
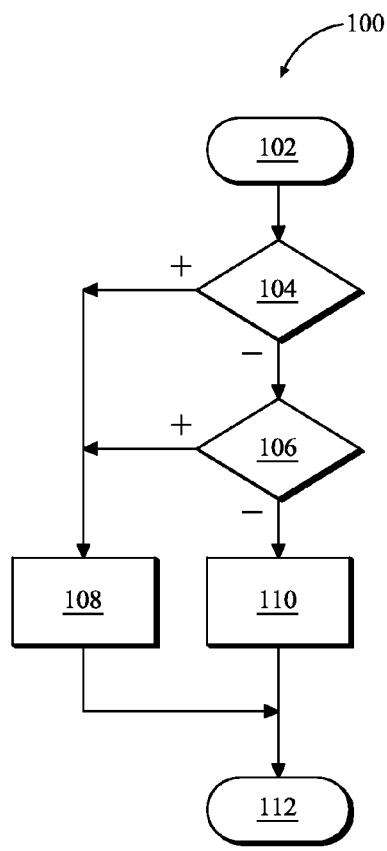
FIG. 3

SHIFT-BY-WIRE SYSTEM FOR A VEHICLE, AND A TRANSMISSION RANGE SELECTION METHOD THEREOF

TECHNICAL FIELD

The present invention relates to a shift-by-wire system for controlling a transmission of a vehicle, and a method for determining a transmission range selection for the transmission.

BACKGROUND

In a traditional automatic transmission system for a vehicle, a shifter is connected to the transmission by a mechanical linkage to change the gears or ranges of the transmission. The transmission ranges may include, but are not limited to, Park, Neutral, Reverse, and Drive. However, shift-by-wire transmission systems have been developed where the mechanical linkage is replaced by an electronic connection through which an electronic signal is sent to the transmission to effect the changing of the transmission ranges. The electronic signal may be activated via a shift lever, buttons, and the like. For example, in some shift-by-wire systems, the transmission may be placed in the Neutral, Reverse, and Drive transmission ranges via a shift lever, and in the Park transmission range via a dedicated park button. In the event that there is a fault with at least one of the electronic signals generated by the shift lever and/or the park button, or if both are activated at the same time, the shift-by-wire system may place the vehicle in a Park mode.

SUMMARY

A shift-by-wire system for controlling a transmission of a vehicle is provided. The shift-by-wire system includes a shift lever that is movable between a plurality of transmission range positions and a null position. Each of the plurality of transmission range positions corresponds to a transmission range of the transmission. The shift lever includes at least one shift lever position sensor configured to sense a position of the shift lever, and to generate a shift lever position signal that communicates the position of the shift lever.

The shift-by-wire system also includes a park button that is switchable between a pressed position and a released position. The pressed position corresponds to a Park transmission range. The park button includes at least one park button position sensor configured to sense a position of the park button, and to generate a park button position signal that communicates the position of the park button.

The shift-by-wire system further includes a controller configured to receive the shift lever position signal and the park button position signal. The controller is also configured to determine a transmission range selection in which to place the transmission based on at least one predetermined condition. If the at least one predetermined condition exists, then the transmission range selection is the Park transmission range. If the at least one predetermined condition does not exist, then the transmission range selection is the transmission range corresponding to the transmission range position in which the shift lever is positioned.

A method for determining a transmission range selection for a transmission of a vehicle via the shift-by-wire system described above is also provided. The method includes first receiving, by the controller, the shift lever position signal and the park button position signal. The method then includes determining if at least one predetermined condition exists. If the at least one predetermined condition exists, then the method includes determining the transmission range selection to be the Park transmission range. If the at least one predetermined condition does not exist, then the method includes determining the transmission range selection to be that corresponding to the transmission range position in which the shift lever is positioned.

A first predetermined condition may be that the park button is in the pressed position or in an unknown position, and the shift lever is in the null position or in an unknown position. A second predetermined condition may be that the shift lever is in one of the plurality of transmission range positions, and the park button is in one of the pressed position or an unknown position, having changed from the released position after the shift lever moved to the one of the plurality of transmission range positions. The park button is in the unknown position when there is a fault with at least one of the park button, the at least one park button position sensor, and the park button position signal, and the shift lever is in the unknown position when there is a fault with at least one of the shift lever, the at least one shift lever position sensor, and the shift lever position signal.

The above features and advantages and other features and advantages of the present invention are readily apparent from the following detailed description of the best modes for carrying out the invention when taken in connection with the accompanying drawings.

BRIEF DESCRIPTION OF THE DRAWINGS

FIG. 1 is a schematic block diagram of a shift-by-wire system of a vehicle;

FIG. 2 is a schematic illustration of a shift pattern for a shift lever of the shift-by-wire system of FIG. 1; and FIG. 3 is a schematic flow diagram illustrating a method of selecting a transmission range via the shift-by-wire system of FIG. 1.

DETAILED DESCRIPTION

Those having ordinary skill in the art will recognize that terms such as "above," "below," "upward," "downward," et cetera, are used descriptively of the figures, and do not represent limitations on the scope of the invention, as defined by the appended claims. Any numerical designations, such as "first" or "second" are illustrative only and are not intended to limit the scope of the invention in any way.

Referring to the drawings, wherein like reference numbers correspond to like or similar components wherever possible throughout the several figures, a shift-by-wire system 10 for controlling the transmission of a vehicle (not shown) is shown in FIG. 1. The shift-by-wire system 10 generally includes a shift lever 12 and a park button 14. The shift lever 12 is used to select different transmission ranges, including, but not limited to, Reverse, Neutral, and Drive.

A driver of the vehicle generally selects a particular transmission range by moving the shift lever 12 to a position corresponding to the transmission range (or a transmission range position). As seen in FIG. 2, the transmission range positions may include, but are not limited to, a reverse position 26 corresponding to the Reverse transmission range, a neutral position 28 corresponding to the Neutral transmission range, and a drive position 30 corresponding to the Drive transmission range. When the driver releases the shift lever 12, it returns to a null position 24 (or a rest position), and the transmission range position 26, 28, or 30 from which the shift lever 12 is moving to the null position 24 generally dictates the transmission range. The positions 24, 26, 28, and 30 are arranged in a shift pattern 22, and are connected by a shift path 32 along which the shift lever 12 moves. While FIG. 2 depicts the positions 24, 26, 28, and 30 in an L-shaped shift pattern 22, it should be appreciated that they may be arranged in any other shift pattern.

The shift lever 12 includes a shift lever position sensor 13 configured to sense the position of the shift lever 12 on the shift path 32, including the transmission range positions 26, 28, and 30, and the null position 24. The shift lever position sensor 13 is also configured to generate a shift lever position signal 18 that communicates the position of the shift lever 12 on the shift path 32 to a controller 16, described below. The shift lever position signal 18 also may communicate that the position of the shift lever 12 is unknown, such as when there is a fault with the shift lever 12, the shift lever position sensor 13, and/or the shift lever position signal 18. While only one shift lever position sensor 13 is shown in FIG. 1, it should be appreciated that there may be any number of shift lever position sensors 13.

The park button 14 is used to select a Park transmission range. It should be appreciated that the park button 14 may include any activation device able to indicate that the Park transmission range has been selected. The park button 14 may be switched between a pressed position and a released position. The pressed position corresponds to the selection of the Park transmission range. The park button 14 includes a park button position sensor 15 configured to generate a park button position signal 20 that communicates the position of the park button 14, i.e., the pressed position or the released position. The park button position signal 20 also may communicate that the position of the park button 14 is unknown, such as when there is a fault with the park button 14, the park button position sensor 15, and/or the park button signal 20, as explained in more detail below. While only one park button position sensor 15 is shown in FIG. 1, it should be appreciated that there may be any number of park lever position sensors 15.

The shift-by-wire system 10 also includes a controller 16 that is in electrical communication with the shift lever position sensor 13 and the park button position sensor 15. The controller 16 is configured to receive the shift lever position signal 18 from the shift lever position sensor 13, and the park button position signal 20 from the park button position sensor 15. The park button position signal 20 may be a voltage read by the controller 16, where a specific voltage or voltage range may correspond to the position of the park button 14. For example, the park button position sensor 15 may be configured to output a voltage between 0 V and 5 V. If the park button position signal 20 is between 0.8 V and 1.0 V, then it may indicate that the park button 14 is in the pressed position. If the park button position signal 20 is between 3.8 V and 4.0 V, then it may indicate that the park button 14 is in the released position. If the park button position signal 20 indicates a voltage that lies outside both of the voltage ranges for the pressed position and the released position, then there may be a fault with the park button 14 and/or the park button position signal 20.

The controller 16 is also configured to determine a transmission range selection when at least one predetermined condition exists, as described in method 100 and depicted in FIG. 3 below. The controller 16 may then communicate the transmission range selection to the transmission or to another controller (not shown). The controller 16 may be a dedicated processing device, or may be shared by a number of components as part of a larger system, such as a vehicle electronic module (not shown).

Referring now to FIG. 3, a method 100 for selecting a transmission range for the transmission of the vehicle via the shift-by-wire system 10 is shown. Method 100 begins at step 102 after which the controller 16 has received the shift lever position signal 18 from the shift lever position sensor 13, and the park button position signal 20 from the park button position sensor 15. As explained above, the shift lever position signal 18 communicates the position of the shift lever 12, e.g., one of the transmission range positions 26, 28, or 30 or the null position 24, and the park position signal 20 communicates the position of the park button 14, e.g., the pressed position or the released position.

After step 102, method 100 proceeds to step 104. At step 104, the controller 16 determines whether a first predetermined condition exists. The first predetermined condition may be that the park button 14 is either in the pressed position or in an unknown position, as communicated by the park button position signal 20, and that the shift lever 12 is in the null position 24 or in an unknown position, as communicated by the shift lever position signal 18. If the first predetermined condition exists, as indicated by the (+) sign, then method 100 proceeds to step 108. If the first predetermined condition does not exist, as indicated by the (−) sign, then method 100 proceeds to step 106.

At step 106, the controller 18 determines if a second predetermined condition exists. The second predetermined condition may be that the shift lever 12 is in one of the transmission range positions 26, 28, or 30, and that the park button 14 is either in the pressed position or in an unknown position, and was changed from the released position after the shift lever 12 was moved to the transmission range position 26, 28, or 30. If the second predetermined condition exists, as indicated by the (+) sign, then method 100 proceeds to step 108. If the second predetermined condition does not exist, as indicated by the (−) sign, then method 100 proceeds to step 110.

At step 108, the controller 16 determines the transmission range selection to be the Park transmission range. On the other hand, at step 110, the controller 16 determines the transmission range selection to be the transmission range corresponding to the transmission range position in which the shift lever 12 is positioned, i.e., the Reverse transmission range, the Neutral transmission range, or the Drive transmission range. Method 100 ends at step 112.

Method 100 enables the driver of the vehicle to still operate the vehicle in the event that the park button 14, the park button position sensor 15, and/or the park button signal 20 fail. This may be accomplished by holding the shift lever 12 in one of the transmission range positions 26, 28, or 30 such that neither the first predetermined condition nor the second predetermined condition is true.

The detailed description and the drawings or figures are supportive and descriptive of the invention, but the scope of the invention is defined solely by the claims. While some of the best modes and other embodiments for carrying out the claimed invention have been described in detail, various alternative designs and embodiments exist for practicing the invention defined in the appended claims.

The invention claimed is:

1. A shift-by-wire system for controlling a transmission of a vehicle, the shift-by-wire system comprising:
   a shift lever movable between a plurality of transmission range positions and a null position, each of the plurality of transmission range positions corresponding to a transmission range, the shift lever having at least one shift lever position sensor configured to sense a position of the shift lever and to generate a shift lever position signal communicating the position of the shift lever;

a park button switchable between a pressed position and a released position, the pressed position corresponding to a Park transmission range, the park button having at least one park button position sensor configured to sense the position of the park button and to generate a park button position signal communicating the position of the park button; and a controller configured to receive the shift lever position signal and the park button position signal, and to determine a transmission range selection in which to place the transmission based on whether at least one predetermined condition exists;

wherein the transmission range selection is the Park transmission range when the at least one predetermined condition exists, and is the transmission range corresponding to the transmission range position in which the shift lever is positioned when the at least one predetermined condition does not exist;

wherein the at least one predetermined condition is that:
the park button is in the pressed position or in an unknown position; and
the shift lever is in the null position or in an unknown position;

wherein the park button is in the unknown position when there is a fault with at least one of the park button, the at least one park button position sensor, and the park button position signal; and wherein the shift lever is in the unknown position when there is a fault with at least one of the shift lever, the at least one shift lever position sensor, and the shift lever position signal.

2. The shift-by-wire system of claim 1 wherein there is a fault with at least one of the park button, the at least one park button position sensor, and the park button position signal when the button position signal indicates that the park button is in neither the pressed position nor the released position.

3. The shift-by-wire system of claim 1 wherein the at least one predetermined condition further includes that the shift lever is in one of the plurality of transmission range positions, and the park button is in one of the pressed position or an unknown position, having changed from the released position after the shift lever moved to the one of the plurality of transmission range positions, where the park button is in the unknown position when there is a fault with at least one of the park button, the at least one park button position sensor, and the park button position signal.

4. The shift-by-wire system of claim 3 wherein there is a fault with at least one of the park button, the at least one park button position sensor, and the park button position signal when the park button position signal indicates that the park button is in neither the pressed position nor the released position.

5. The shift-by-wire system of claim 1 wherein the plurality of transmission range positions include a reverse position corresponding to a Reverse transmission range, a drive position corresponding to a Drive transmission range, and a neutral position corresponding to a Neutral transmission range.

6. A method for determining a transmission range selection for a transmission of a vehicle via a shift-by-wire system including a shift lever that has at least one shift lever position sensor configured to generate a shift lever position signal, and a park button that has at least one park button position sensor configured to generate a park button position signal, the method comprising:

receiving, by a controller, the park button position signal and the shift lever position signal;

determining, by the controller, if at least one predetermined condition exists;

if the at least one predetermined condition exists, then determining the transmission range selection to be a Park transmission range; and if the at least one predetermined condition does not exist, then determining the transmission range selection to be the transmission range corresponding to the transmission range position in which the shift lever is positioned;

wherein the shift lever is movable between a plurality of transmission range positions and a null position, each of the plurality of transmission range positions corresponding to a transmission range, the shift lever position signal corresponding to a position of the shift lever; and wherein the park button is switchable between a pressed position and a released position, the pressed position corresponding to the Park transmission range, the park button position signal corresponding to a position of the park button;

wherein the at least one predetermined condition is that:
the shift lever is in one of the plurality of transmission range positions; and
the park button is in one of the pressed position or an unknown position, having changed from the released position after the shift lever moved to the one of the plurality of transmission range positions; and wherein the park button is in the unknown position when there is a fault with at least one of the park button, the at least one park button position sensor, and the park button position signal.

7. The method of claim 6 wherein the at least one predetermined condition further includes that the park button is in the pressed position or in an unknown position, and the shift lever is in the null position or in an unknown position, where the park button is in the unknown position when there is a fault with at least one of the park button, the at least one park button position sensor, and the park button position signal, and where the shift lever is in the unknown position when there is a fault with at least one of the shift lever, the at least one shift lever position sensor, and the shift lever position signal.

8. The method of claim 7 wherein there is a fault with at least one of the park button, the at least one park button position sensor, and the park button position signal when the park button position signal indicates that the park button is in neither the pressed position nor the released position.

9. The method of claim 6 wherein there is a fault with at least one of the park button, the at least one park button position sensor, and the park button position signal when the park button position signal indicates that the park button is in neither the pressed position nor the released position.

10. A method for determining a transmission range selection of a shift-by-wire system having a shift lever and a park button, the shift lever being movable between a plurality of transmission range positions each corresponding to a transmission range, the shift lever having at least one shift lever position sensor configured to generate a shift lever position signal, and the park button being movable between a pressed position and a released position, the pressed position corresponding to a Park transmission range, the park button having at least one park button position sensor to generate a park button position signal, the method comprising:

receiving, by a controller, the park button position signal and the shift lever position signal;

determining, by the controller, if at least one of a first condition and a second condition exists;

if at least one of the first condition and the second condition exists, then determining the transmission range selection for the transmission to be the Park transmission range; and if neither of the first condition and the second condition exists, then determining the transmission range selection for the transmission to be the transmission range corresponding to the transmission range position in which the shift lever is positioned;

wherein the first condition is that the park button is in the pressed position or in an unknown position, and the shift lever is in the null position or in an unknown position;

wherein the second condition is that the shift lever is in one of the plurality of transmission range positions, and the park button is in one of the pressed position or the unknown position, having changed from the released position after the shift lever moved to the one of the plurality of transmission range positions; and wherein the park button is in the unknown position when there is a fault with at least one of the park button, the at least one park button position sensor, and the park button position signal, and the shift lever is in the unknown position when there is a fault with at least one of the shift lever, the at least one shift lever position sensor, and the shift lever position signal.

11. The method of claim 10 wherein there is a fault with at least one of the park button, the at least one park button position sensor, and the park button position signal when the park button position signal indicates that the park button is in neither the pressed position nor the released position.

* * * * *